Sept. 20, 1938.   N. H. GILMAN   2,130,462
BEARING
Original Filed May 6, 1929
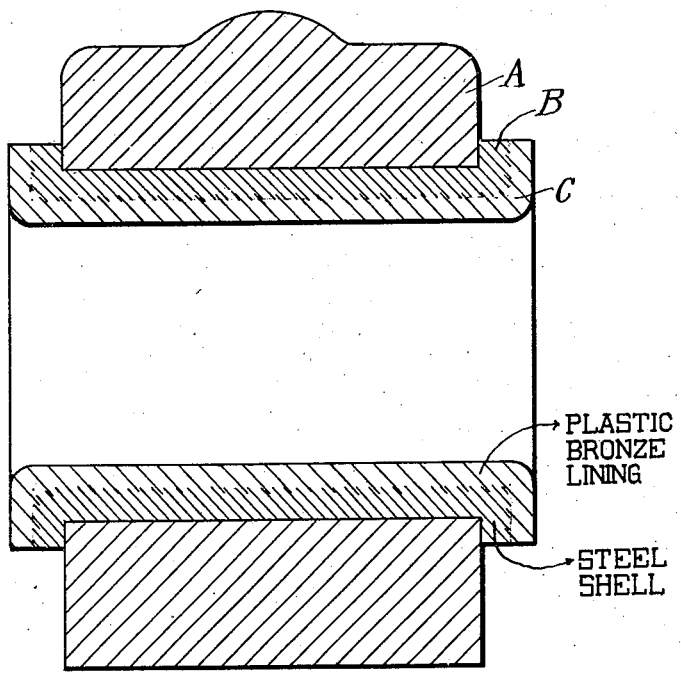
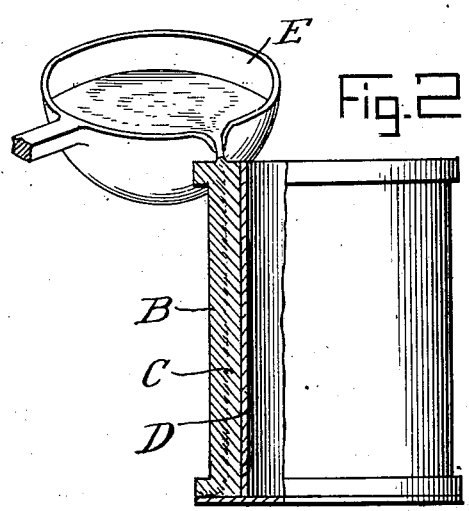
Inventor
Norman H. Gilman
By E. W. Bradford
Attorney Patented Sept. 20, 1938

2,130,462

UNITED STATES PATENT OFFICE 2,130,462

BEARING

Norman H. Gilman, Indianapolis, Ind., assignor, by mesne assignments, to General Motors Corporation, Detroit, Mich., a corporation of Delaware Original application May 6, 1929, Serial No. 360,899. Divided and this application November 14, 1931, Serial No. 575,117

9 Claims. (Cl. 308—237)

In the development of motors designed for high speed and heavy loads it is important that they be of the lightest weight possible in order to require a minimum of power to propel their own weight and, therefore, that metal of the lightest weight possible be employed. This has resulted in the improvement of metals used for such purposes so that the weight has been decreased without impairing the strength and endurance qualities but more flexibility and greater vibration has resulted, such improved metals being capable of withstanding more or less flexing. Such flexing and resulting vibration of the metals as well as the speed of or the load carried by the motor causes a strain upon the bearings used which breaks down lining of such material as Babbitt metal, which has heretofore been generally employed for such purposes, and also results in the loosening of the bond between the Babbitt lining and the metal of which the shell is composed, thereby materially decreasing the life of the bearing and impairing its efficiency in use. Inasmuch as the value of the motor in service can equal only the life of the bearing it becomes more and more important in the development of this art that bearings be provided which will stand up under "pounding" and vibration due to the great speed, and the great load imposed without danger of destruction in the performance of such duty and particularly without separation of the metals of which the shell and the lining are composed.

It is now recognized in the art that motor bearings are one of the most vital parts of the motor and that the life of the motor, its value and dependability in service and therefore the safety of the thing propelled and of its load depend more largely upon the ability of the bearings to withstand the strain and wear resulting from the constant "pounding" of the motor and particularly is this true in very high speed airplane motors than upon most any other consideration.

The present application is a division of my application 360,899 filed May 6, 1929.

The object of my said invention is to provide a bearing composed of metals which will provide a bearing of the necessary strength and rigidity with a surface which will be of comparatively soft wearing quality but at the same time capable of resisting much higher temperature and withstanding much greater strain or pounding in service than metals such as Babbitt metal; and also one in which the metals are united by a bond that makes them practically integral and incapable of separation under flexing or any other strain. I have found by experience that a steel shell affords the best foundation for a bearing such as required for the purpose indicated for the reason that it may be of lighter weight for the same degree of strength than any other metal which I have found suitable for the purpose. I have also found that so-called "plastic bronze" makes a most desirable metal for the lining or wearing surface for the bearing. By "plastic bronze" I mean a composition composed of copper and lead the proportions of which may be varied to suit different conditions and different requirements, a suitable composition being thirty (30) parts of lead and seventy (70) parts of copper. "Plastic bronze" is generally understood to also include if desired, copper alloys of from four per cent (4%) to seven per cent (7%) tin with twenty per cent (20%) to thirty per cent (30%) lead and with or without small quantities of nickel. It will therefore be understood that in using the term "plastic bronze" herein it is intended to include by such term all such suitable compositions and variations thereof. As is well known the melting point of steel is considerably higher than the melting point of bronze but the melting point of bronze is higher than the melting point of babbitt and the bronze of a composition such as above indicated while affording a most excellent surface for the bearings of high speed motors nevertheless is of a density and tenacity capable of resisting the wear and heavy duty required.

In the manufacture of bearings of my said invention I employ a method by which the steel shell and bronze lining, or bearing surface, are united by fusing the two metals to unite them by a bond that makes them practically integral and permanent so that separation under any strain, load or vibration imposed by the duty of the motor is impossible.

In the accompanying drawing, Figure 1 illustrates a bearing such as contemplated by my invention. The bearing housing usually of aluminum or any other appropriate metal is indicated by the reference letter A, the relatively thin steel shell or back of the bearing by the reference letter B, and the bronze lining of said bearing by the reference letter C.

In Figure 2 I illustrate a method of forming the bearing which consists in mounting a cylinder D with a bottom $d$ within the thin steel shell B and pouring the molten bronze from a ladle E into the space between the cylinder and the inner surface of the shell. It will be understood of course that the ends of the bearing and other parts if desired, are machined off appropriately after the bearing is finished. The bottom d of the cylinder D is large enough to cover the end of the shell B, as clearly indicated.

In the practice of the method by which these bearings are produced a steel shell of appropriate thickness (as thin and light as the duty to be imposed will permit) is heated to a temperature which is approximately the temperature required (or higher) for melting the bronze metal which is to be used to provide the bearing surface. The bronze metal is heated not only to the melting point but to approximately 200°, more or less, above its melting point and then is applied to the surface of the shell by the method heretofore described and as illustrated in Figure 2 of the drawing, or by any other method or means found appropriate. The bronze metal being in a fluid condition and the steel of a temperature substantially the same as that of such bronze metal, the two metals fuse and firmly unite forming a bond that makes the two metals practically integral and incapable of separation regardless of strain, flexing or other duty imposed.

After the bronze metal is poured or otherwise applied to the steel shell it is allowed to cool for a short period sufficient to allow the two metals to fuse together but before the lead in the composition of the bronze can settle and separate from the copper by reason of its greater gravity the bearing is quickly cooled, as by being immersed in a cold bath, so that the copper and lead content of the bronze composition are held in the metal properly mixed and of the same relative proportions throughout.

While the method described, and as made the subject matter of my aforementioned application 360,899, filed May 6, 1929, has been found particularly adapted for the purpose set forth, it will be understood of course that it may be modified and that my invention, broadly speaking, consists of a bearing formed by any method or means found appropriate which consists of a steel shell provided with a lining of plastic bronze, the two metals being united by fusion whereby a permanent bond is secured between them, substantially as defined by the appended claims.

Having thus fully described my said invention, what I claim as new and desire to secure by Letters Patent, is:

1. A bearing comprising a shell of steel of a relatively thin and somewhat flexible character as herein described provided with a lining of plastic bronze fused thereto.

2. A bearing comprising a shell of steel as herein described and a lining of plastic bronze within said shell; the two being united by fusion whereby a permanent bond is secured between them and a lined bearing of practically integral or single-piece construction produced.

3. A bearing comprising a shell of steel of a relatively thin and somewhat flexible character as herein described and a lining of plastic bronze within said shell and fused thereto, whereby a bearing is provided of practically integral or single-piece construction.

4. As an article of manufacture, a bearing comprising an iron or steel layer and a layer consisting mainly of copper and lead; said layers being securely, uniformly and autogenously bonded together.

5. As an article of manufacture, a bushing comprised of a layer of relatively infusible copper-lead alloy welded to a backing of stronger supporting metal.

6. As an article of manufacture, a steel bearing bushing having integrally and directly bonded onto its surface a layer of bearing metal consisting mainly of copper and lead and possessing the microstructure chracteristic of rapid solidification.

7. An article of manufacture comprising a layer of iron or steel and a layer containing lead, said layers being integrally, uniformly, directly and firmly bonded each to the other, the proportion of lead in said layer containing lead being at least thirty (30%) percent thereof.

8. An article of manufacture comprising a layer of iron or steel and a layer consisting of copper-lead bronze, said layers being integrally, uniformly, firmly and directly bonded each to the other, the amount of lead in said copper-lead bronze being at least thirty (30%) percent thereof.

9. A bearing comprising an iron or steel shell, and a lining of bearing metal consisting mainly of copper and lead within said shell, the two being united by fusion, whereby a permanent bond is secured between them and a lined bearing of practically integral or single-piece construction produced.

NORMAN H. GILMAN.